United States Patent Office 3,006,220
Patented Oct. 31, 1961

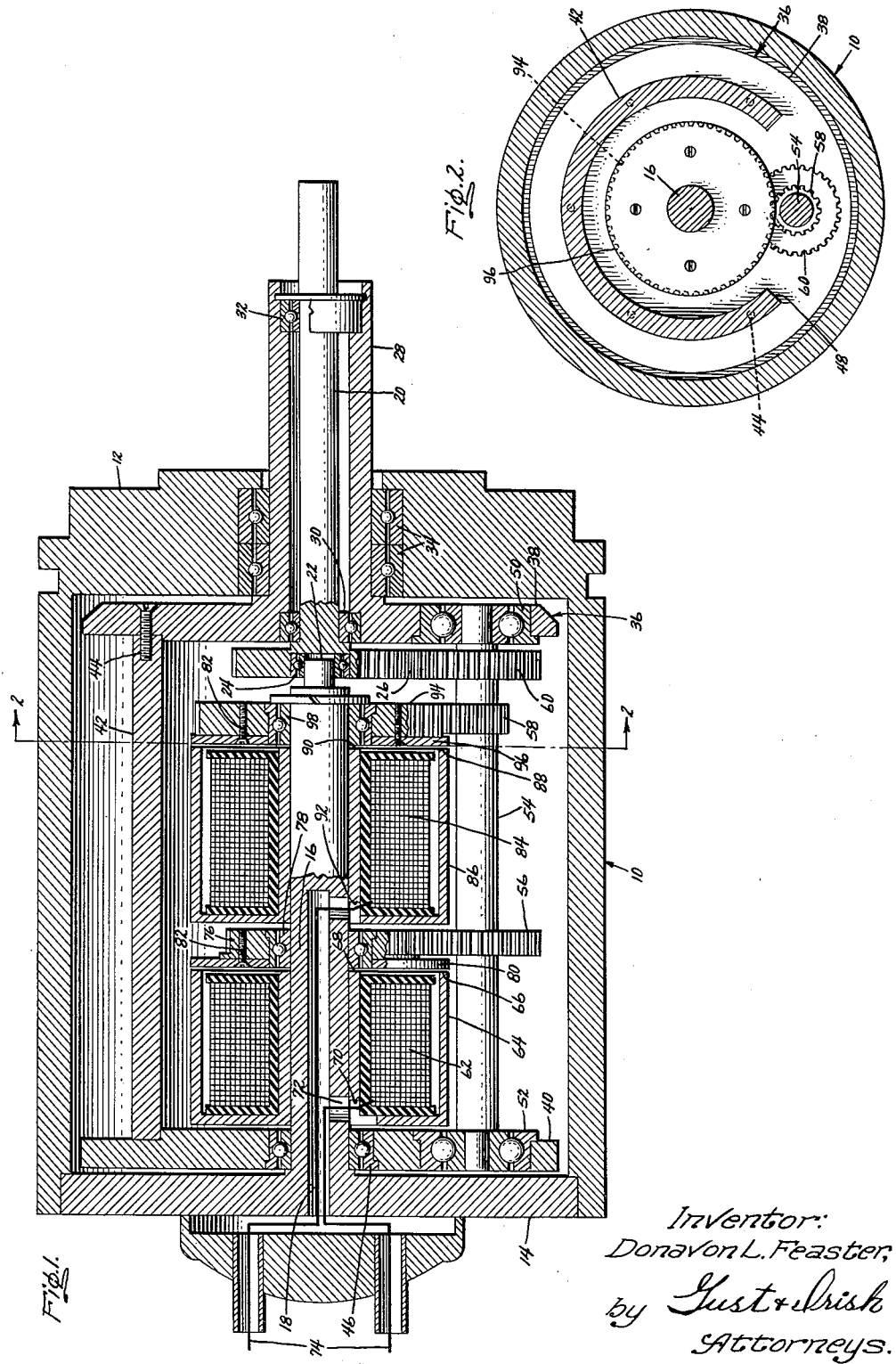

3,006,220
MULTIPLE RATIO SPEED CHANGER
Donavon L. Feaster, New Haven, Ind., assignor to Bowmar Instrument Corporation, Fort Wayne, Ind.
Filed Nov. 17, 1958, Ser. No. 774,454
11 Claims. (Cl. 74—766)

The present invention relates to a multiple ratio speed changer, and more particularly to a speed changer having multiple speed-changing sub-assemblies which are independently operable for altering the speed ratio between two rotatable shafts or members.

In the art of multi-speed power transmissions or speed changers to which this invention relates, conventional constructions are capable of alternatively providing speed ratios between input and output shafts of some such order, as 100-to-1, and 1-to-1, respectively. An example of such a prior art speed changer is found in Feaster application Ser. No. 738,411, filed May 28, 1958, and entitled "Gear Mechanism." This prior speed changer incorporates an epicyclic gear train having two sun gears and a clutch plate interposed therebetween. A spring is used to force the two sun gears into frictional, locking engagement with the clutch plate whereby the three parts may be rotated as one. To the two sun gears are assembled input and output shafts which are rotatable in unison when the two sun gears and the clutch plate are thus locked together. This mode of operation provides a 1-to-1 speed ratio.

In order to obtain a different speed ratio, an electromagnetic actuator is energized to separate the sun gears from each other and to lock one against rotation. Assuming that the locked gear has one less tooth than the other sun gear, a planetary set of pinions meshed with these two gears and rotatable as a unit thereabout will serve to rotate the unlocked sun gear, depending upon the tooth ratios employed. If the stationary gear has one less tooth than the rotatable sun gear, the latter gear will be advanced one tooth for each orbiting revolution of the planetary pinions. This phenomenon is well known in the art and is commonly employed in different types of eipcyclic gear trains. By advancing one tooth, it follows that the input and output shafts will rotate at speed ratios of 100-to-1. This ratio can be altered by changing the number of teeth on the various gears.

Of significance is the fact that the aforedescribed type of gear changer has one of its speed ratios limited in every instance to 1-to-1, the other ratio being any one desired within the limitations of tooth ratios between gears.

The present invention differs generally in the respect that it can provide two or more speed ratios, neither being limited to a 1-to-1 ratio. Still further, this result is achieved without the use of any actuating springs or clutch plates.

It is therefore an object of this invention to provide a multi-speed power transmission or speed changer selectively actuable to provide two or more speed ratios by means of simple, interlocked and alternatively actuable speed-changing sub-assemblies.

It is another object of this invention to provide a multiple ratio speed changer which is entirely self-contained and needs no external gear trains for obtaining two or more odd speed ratios between input and output shafts.

It is yet another object of this invention to provide a multiple ratio speed changer which is susceptible of being modified by the addition of speed-changing sub-assemblies which are so interconnected as to make available a greater number of output speed ratios.

In achieving a multiple ratio speed changer of this invention there are provided relatively rotatable input and output members, a first sun gear carried by the output member, a first planetary gear meshed with said first sun gear and mounted for rotation on the input member, a second sun gear mounted for free rotation on a support, a second planetary gear meshed with the second sun gear and secured to the first planetary gear for rotation therewith, a third sun gear mounted for free rotation on a support, a third planetary gear meshed with the third sun gear and secured to the first and second planetry gears for rotation therewith, and means for alternatively holding said second and third sun gears against rotation. This particular speed changer provides two different speed ratios; however, if it is desired to secure a greater number of speed ratios, it is only necessary to increase the number of sun gear and planetary gear sub-assemblies by the same number. For example, if it were desired to obtain three different speed ratios, it would only be necessary to add a fourth sun gear and a fourth planetary gear meshed therewith, this fourth planetary gear being secured to the first and second planetary gears for rotation therewith.

To the accomplishment of the above and related objects, the invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

FIG. 1 is a longitudinal sectional illustration of one embodiment of this invention; and FIG. 2 is a sectional illustration taken substantially along section line 2—2 of FIG. 1.

Referring to the drawings, the speed changer illustrated comprises a cylindrically-shaped housing 10 having opposite end plates 12 and 14, respectively. The end plate 14 carries a centrally disposed, axially extending, internal, stationary supporting member or shaft 16 which preferably is cylindrical and terminates at its right-hand end just short of the end plate 12.

This shaft 16 is provided with an axially extending bore 18 for receiving suitable electric circuits or leads, as will be described more fully hereinafter.

Axially coextensive with said supporting shaft 16 is a rotatable output shaft 20 which extends from the point adjacent to the right-hand end 22 of the supporting shaft to a point outside of the housing 10. The shaft 20 is rotatably mounted on the stationary shaft end 22 by means of a suitable ball bearing assembly 24 and carries adjacent to this end 22 a sun gear 26. This sun gear 26 is coaxial with the output shaft 20 and the supporting shaft 16.

A hollow input shaft 28 is coaxially and rotatably mounted on the output shaft 20 by means of two spaced bearing assemblies 30 and 32, the shaft 28 being rotatably mounted in the end plate 12 of the housing 10 by means of two suitable bearing assemblies 34.

A carrier assembly, generally indicated by the reference numeral 36, is secured to the inner end of the input shaft 28 and comprises two end plates 38 and 40, respectively, which are connected together by means of a part-cylindrical carrier-plate spacer 42 (FIG. 2). The end plate 38 extends radially outwardly from the inner end of the shaft 28 and preferably is integral therewith. The two plates 38 and 40 are secured to the spacer 42 by some suitable means such as screws 44. The end plate 40 is rotatably mounted on the stationary shaft 16 by means of a bearing assembly 46. Thus, the completed carrier assembly is rotatable about its axis which preferably coincides with the shaft 16 axis, one end being supported on the stationary shaft 16 and the other end on the output shaft 20.

As is more clearly shown in FIG. 2, the part cylindrical spacer 42 has an arcuate, axially extending segment removed or absent therefrom, thereby providing an elongated, axially extending opening 48 having a purpose which will become apparent from the following explanation.

In the two carrier end plates 38 and 40 are mounted two ball bearing assemblies 50 and 52, respectively, which receive the opposite ends of an axially extending planetary pinion shaft 54. These bearings 50 and 52 are radially positioned equidistant from the axis of the carrier and support the planetary shaft 54 for free rotation. On the shaft 54 are mounted three axially spaced apart planetary gears 56, 58 and 60, these planetary gears being fixedly secured to the shaft 54 by some suitable means, so as to be rotatable in unison. As seen in FIG. 1, the planetary gear 60 meshes with the sun gear 26.

Adjacent to the carrier end plate 52 and fixedly secured on the stationary supporting shaft 16 is a magnetic actuator composed of a magnetizing coil 62 which is wound on an annular iron or the like yoke 64 having opposite polarity, annular pole faces 66 and 68, respectively. The yoke 64 is provided with an aperture 70 in one corner which communicates with a radial opening 72 in the stationary shaft 16 and the shaft bore 18. Suitable leads 74 connected to the coil 62 pass through the openings 70 and 72 and out of the end of the bore 18, at which point they may be provided with terminals for connection to external circuitry. Adjacent the two pole faces 66 and 68 is mounted a sun gear 76 supported for both rotary and axial sliding movement by means of a ball bearing or the like assembly 78 on the stationary shaft 16. To the left-hand face of the gear 76, as viewed in FIG. 1, is secured a disc or contact plate 80 of iron or some suitable magnetic material, this disc being flat on its left-hand side for intimate engagement with the magnetic pole faces 66 and 68, respectively. Normally, this disc 80 is spaced slightly from the pole faces 66 and 68 when the actuator is unenergized. The gear 76 and the contact plate 80 being secured together by screws 82 or the like, provides a sun gear subassembly which is capable of free rotation on the shaft 16 as well as limited axial sliding movement into and out of engagement with the pole faces 66 and 68.

The planetary gear 56 meshes with the sun gear 76 as shown in FIG. 1.

A second magnetic actuator is fixedly mounted on the supporting shaft 16 on the right-hand side of the sun gear assembly 76, 80 and preferably is a duplicate of the actuator 62, 64 just described. This second actuator is composed of a coil 84 mounted on an annular yoke 86 of magnetic material, this yoke having outer and inner pole faces 88 and 90, respectively. One corner of this yoke 86 is provided with an aperture 92 through which the connecting leads for the coil 84 may pass into the supporting shaft bore 18 and out of the left-hand end thereof.

Any means may be used for securing the yokes 64 and 86 to the stationary shaft 16, such as press fitting the parts together.

Another sun gear assembly composed of a gear 94 joined to a magnetic contact plate or disc 96 is rotatably and slidably mounted on the stationary shaft 16 by means of a ball bearing assembly 98. The gear assembly 94, 96 when moved to its extreme right-hand position is spaced a short distance from the magnetic pole faces 88 and 90, but upon energization of the magnet 84, the assembly is moved into firm, locking engagement with these pole faces. The same is true of the sun gear assembly 76, 80 with respect to its pole faces 66 and 68.

The two gears 58 and 94 are meshed, thereby completing the gear train.

In operation, and first assuming that neither of the actuators 62 and 84 are energized, the two sun gears 76 and 94 will float, or, in other words, be free to rotate on the supporting shaft 16. Imparting rotation to the input shaft 28 causes similar rotation of the carrier assembly 36 which carries with it the planetary shaft 54 and the three planetary gears 56, 58 and 60. Since neither of the sun gears 76 and 94 are constrained against movement, the planetary gears 56 and 58 merely move thereabout and cause no forceful rotation of the output shaft 20. As a matter of fact, the output shaft 20 may be easily held against rotation, in which case none of the input rotation is transmitted to the output shaft.

However, by energizing the actuator 62, for example, the contact plate 80 will be drawn thereagainst and held against rotation thereby locking the sun gear 76 against rotation. Rotation of the input shaft 28 thereupon causes the planetary gear 56 to roll around the sun gear 76 in turn imparting rotation to the planetary shaft 54, the gear 60 and the output shaft sun gear 26. Assuming that the gears 56 and 76 have a different tooth ratio than the two gears 26 and 60, the gear 26 will be rotated at a different speed than the input shaft 28. More specifically, again assuming that the sun gear 76 is held against rotation, if this gear has one less tooth than the sun gear 26, each revolution of the planetary gear 56 around its sun gear 76 advances the sun gear 26 one tooth. This being true, the gear 26, or in other words the output shaft 20, rotates at a speed ratio of 100-to-1 with respect to the rotation of the input shaft 28. This mode of operation of planetary gear trains is well known in the art.

A different speed ratio for the output shaft 20 is obtained by de-energizing the magnet 62 and then immediately energizing the magnet 84. This permits the sun gear 76 to freely rotate but locks the sun gear 94 in stationary position against the pole faces 88 and 90, whereupon rotary motion is imparted to the planetary gear 58 as it orbits around the circumference of the sun gear 94. This in turn imparts rotary motion to the planetary gear 60 and the sun gear 26 on the output shaft 20.

As will now be obvious, different tooth ratios may be used in the gear sets 56, 76 and 58, 94 in order to obtain two different speeds of rotation of the output shaft 20 for a given rotational speed of the input shaft 28. Typical design data for achieving the two speed ratios of 50-to-1 and 1-to-1 may be as follows: the two gears 76 and 56 have fifty-one (51) and twenty-five (25) teeth at 72-pitch, respectively, and the two gears 94 and 58 have sixty (60) and fifteen (15) teeth at 72-pitch, respectively, while the two gears 26 and 60 have fifty (50) and twenty-five (25) teeth at 72-pitch, respectively.

From the foregoing, it will be apparent that the speed changer of this invention uses no springs or mechanical clutches for achieving different speed ratios. Also, it will be noted that any two desired speed ratios may be attained without the necessity of using external gear trains, e.g., such two speed ratios could be the odd figures of 3-to-1 and 11-to-1 or 3-to-1 and 27-to-1. Still further, if it is desired to obtain more than two speed ratios in any given construction, it is only necessary to add sun gear and actuator subassemblies which provide the speed ratio desired. For example, if three different speed ratios were needed, it would be necessary to add only a third magnetic actuator and sun gear subassembly in tandem with the two disclosed, obviously, it being necessary to lengthen the carrier assembly 36 as well as the housing 10 and the supporting shaft 16. Thus the design lends itself to a facile and economical method of obtaining plural speed ratios with only one basic type construction, the parts of the different speed-ratio constructions being substantially interchangeable.

If the input shaft 28 is to be rotated at high speeds, it is preferable that the carrier 36 and the planetary gears mounted thereon as a unit be dynamically balanced about the carrier axis of rotation. By providing the cutaway portion 48 (FIG. 2) in the carrier assembly 36, this dynamic balance may be achieved.

Since contact plates 80 and 96 are secured to the respective sun gears 76 and 94 and are made of a suitable magnetic material, the sun gears themselves may be formed of nonmagnetic material such as brass, plastic or the like.

What is claimed is:

1. A multi-speed power transmission comprising relatively rotatable input and output shafts, a carrier mounted on and rotatable with said input shaft, a first sun gear on said output shaft and rotatable therewith; a support, said carrier being rotatably mounted on said support, second and third sun gears directly mounted for rotation on said support; first, second and third planetary gears meshed with said first, second and third sun gears, respectively, said planetary gears being connected together for rotation, said planetary gears being rotatably mounted on said carrier, and two electromagnetic actuators fixedly mounted on said support on opposite axial sides of said third sun gear and alternatively engageable with said second and third sun gears for selectively holding the latter against rotation, the gear ratio between said second sun and said planetary gears being different than the ratio between said third sun and said third planetary gears.

2. A multi-speed power transmission comprising a carrier having a cylindrically shaped body and opposite end plates; a hollow shaft coaxially secured to one end plate and extending axially outwardly therefrom, the axes of said carrier and said shaft being coextensive; a second shaft coaxially mounted for rotation inside said hollow shaft; an elongated stationary supporting member having a longitudinal axis which coincides with said carrier axis; first, second and third sun gears disposed inside said carrier for independent rotation about an axis coextensive with said carrier axis; said first sun gear mounted on said second shaft for rotation therewith; said second and third sun gears rotatably carried by said supporting member; an axially extending planetary shaft rotatably mounted on said end plates; first, second and third planetary gears fixedly mounted on said planetary shaft and meshed, respectively, with said first, second and third sun gears; and means secured to said supporting member on axially opposite sides of said third sun gear and alternatively engageable with said second and third sun gears for selectively holding the latter against rotation, the gear ratio of said second sun and said second planetary gears being different than the ratio of said third sun and said third planetary gears.

3. A multi-speed power transmission comprising a carrier having a cylindrically shaped body and opposite end plates; a hollow shaft coaxially secured to one end plate and extending axially outwardly therefrom, the axes of said carrier and said shaft being coextensive; a second shaft coaxially mounted for rotation inside said hollow shaft; an elongated stationary supporting member having a longitudinal axis which coincides with said carrier axis; first, second and third sun gears axially spaced apart and disposed inside said carrier for independent rotation about an axis coextensive with said carrier axis; said first sun gear mounted on said second shaft for rotation therewith; said second and third sun gears rotatably carried directly by said supporting member; an axially extending planetary shaft rotatably mounted on said end plates; first, second and third planetary gears fixedly mounted on said planetary shaft and meshed, respectively, with said first, second and third sun gears; means secured to said supporting member on axially opposite sides of said third sun gear and alternatively engageable with said second and third sun gears for selectively holding the latter against rotation; and a housing enclosing said carrier, said housing being secured to said supporting member, the gear ratio of said second sun and said second planetary gears being different than the ratio of said third sun and said third planetary gears.

4. A multi-speed power transmission comprising a carrier having a cylindrically shaped body and opposite end plates; a hollow shaft coaxially secured to one end plate and extending axially outwardly therefrom, the axes of said carrier and said shaft being coextensive; a second shaft coaxially mounted for rotation inside said hollow shaft; an elongated stationary supporting member having a longitudinal axis which coincides with said carrier axis; first, second and third sun gears axially spaced apart and disposed inside said carrier for independent rotation about an axis coextensive with said carrier axis; said first sun gear mounted on said second shaft for rotation therewith; said second and third sun gears rotatably carried directly by said supporting member; an axially extending planetary shaft rotatably mounted on said end plates; first, second and third planetary gears fixedly mounted on said planetary shaft and meshed, respectively, with said first, second and third sun gears; two electromagnetic actuators mounted in spaced-apart relation on said supporting member on opposite sides of said third sun gear; said second and third sun gears being operatively positioned immediately adjacent to said actuators, respectively; and circuit means for alternatively energizing said actuators, respectively, for holding selectively said second and third sun gears against rotation, the gear ratio of said second sun and said second planetary gears being different than the ratio of said third sun and said third planetary gears.

5. A multi-speed power transmission comprising a carrier having a cylindrically shaped body and opposite end plates; a hollow shaft coaxially secured to one end plate and extending axially outwardly therefrom, the axes of said carrier and said shaft being coextensive; a second shaft coaxially mounted for rotation inside said hollow shaft; an elongated stationary supporting member having a longitudinal axis which coincides with said carrier axis; first, second and third sun gears axially spaced apart and disposed inside said carrier for independent rotation about an axis coextensive with said carrier axis; said first sun gear mounted on said second shaft for rotation therewith; said second and third sun gears rotatably carried directly by said supporting member; an axially extending planetary shaft rotatably mounted on said end plates; first, second and third planetary gears fixedly mounted on said planetary shaft and meshed, respectively, with said first, second and third sun gears; two electromagnetic actuators secured in spaced-apart relation on said supporting member on opposite sides of said third sun gear; said second and third sun gears being operatively positioned immediately adjacent to said actuators, respectively; and two electrical circuits for said actuators, respectively, said circuits passing through the central portion of said supporting member and terminating outside thereof, the gear ratio of said second sun and said second planetary gears being different than the ratio of said third sun and said third planetary gears.

6. A multi-speed power transmission comprising a cylindrical housing having first and second end plates, an elongated supporting member inside and fixed to said housing and extending along the axis thereof, said supporting member being secured at one end to said first end plate, an output shaft having opposite ends, one of said opposite ends being inside said housing and rotatably supported on the other end of said supporting member, the other opposite end of said shaft extending outside of said housing, the shaft and supporting member axes being coextensive, a first sun gear on the inner end of said output shaft, an input shaft coaxial with and rotatably mounted on said output shaft, said second housing end plate being rotatably mounted on said input shaft, a cylindrically shaped carrier disposed inside said housing, said carrier having a part-cylindrical body and two end plates, one carrier end plate being rotatably mounted on said supporting member, the other carrier end plate being secured to the inner end of said input shaft, an axially extending planetary shaft having opposite ends journaled in said carrier end plates, respectively, said planetary shaft being disposed in the open portion of said body, two spaced apart electromagnetic actuators fixedly mounted on said supporting member, a second sun gear mounted for free rotation and axial sliding movement on said supporting member in between said two actuators, said second sun gear being engageable with one of said actuators, a third sun gear mounted for free rotation and axial sliding movement on said supporting member adjacent to the other of said actuators, said third sun gear being engageable with said other actuator, engageable friction surfaces provided on each actuator and its respective sun gear whereby selective action of either actuator serves to lock the respective sun gear against rotation, two circuits for said two actuators, respectively, which pass through said supporting member and out the first end plate of said housing, and three planetary gears meshed with the three sun gears, respectively, and fixedly mounted on said planetary shaft, said carrier with said planetary shaft and gears being dynamically balanced, the gear ratio of one pair of meshed sun and planetary gears being different than the ratio of another pair of meshed sun and planetary gears.

7. A multi-speed transmission comprising an elongated stationary support, first and second actuators mounted on said support in axially spaced relation, a rotatable output shaft operatively mounted on said support, a first sun gear on said output shaft, a second sun gear rotatably mounted on said support and being operatively associated with said first actuator, said first actuator including means for holding selectively said second gear against rotation, a third sun gear rotatably mounted on said support and being operatively associated with said second actuator, said second actuator including means for holding selectively said third gear against rotation, a gear carrier rotatably mounted on said support in coaxial relationship therewith, first, second and third planetary gears meshed with said first, second and third sun gears respectively, said planetary gears being connected together for rotation, said planetary gears being rotatably mounted on said carrier, and an input shaft connected to said carrier for imparting rotation to the latter, the gear ratio of said second sun and said second planetary gears being different than the ratio of said third sun and said third planetary gears.

8. A multi-speed transmission comprising an elongated stationary support, first and second electromagnetic actuators mounted on said support in axially spaced relation, a rotatable output shaft operatively mounted on said support, a first sun gear on said output shaft, a second sun gear rotatably mounted on said support and being operatively associated with said first actuator, said first actuator including means for holding selectively said second gear against rotation, a third sun gear rotatably mounted on said support and being operatively associated with said second actuator, said third sun gear being disposed between said actuators, said second actuator including means for holding selectively said third gear against rotation, a gear carrier rotatably mounted on said support in coaxial relationship therewith, first, second and third planetary gears meshed with said first, second and third sun gears respectively, said planetary gears being connected together for rotation, said planetary gears being rotatably mounted on said carrier, and an input shaft connected to said carrier for imparting rotation to the latter, the gear ratio of said second sun and said second planetary gears being different than the ratio of said third sun and said third planetary gears.

9. A multi-speed transmission comprising an elongated stationary support, first and second electromagnetic actuators mounted on said support in axially spaced relation, each said actuator including a coil surrounding a member of magnetic material having opposite magnetic poles, a rotatable output shaft operatively mounted on said support, a first sun gear on said output shaft, a second sun gear rotatably and axially slidably mounted on said support in operative engagement with one pole of said first actuator, said second sun gear being magnetically attractable to said one pole, a third sun gear rotatably and axially slidably mounted on said support in operative engagement with one pole of said second actuator, said third sun gear being interposed axially between said actuators and being magnetically attractable to the last-mentioned pole, a gear carrier rotatably mounted on said support in coaxial relationship therewith, first, second and third planetary gears meshed with said first, second and third sun gears respectively, said planetary gears being connected together for rotation, said planetary gears being rotatably mounted on said carrier, and an input shaft connected to said carrier for imparting rotation to the latter, the gear ratio of said second sun and said second planetary gears being different than the ratio of said third sun and said third planetary gears.

10. A multi-speed transmission comprising an elongated stationary support, first and second actuators mounted on said support in axially spaced relation, a rotatable output shaft operatively mounted on said support, a first sun gear on said output shaft, a second sun gear rotatably mounted on said support and being operatively associated with said first actuator, said first actuator including means for holding selectively said second gear against rotation, a third sun gear rotatably mounted on said support and being operatively associated with said second actuator, said second actuator including means for holding selectively said third gear against rotation, a gear carrier rotatably mounted on said support in coaxial relationship therewith, first, second and third planetary gears meshed with said first, second and third sun gears respectively, said planetary gears being connected together for rotation, said planetary gears being rotatably mounted on said carrier, the combination of said gear carrier and said planetary gears being dynamically balanced for rotation about the axis of rotation of said gear carrier, and an input shaft connected to said carrier for imparting rotation to the latter, the gear ratio of said second sun and said second planetary gears being different than the ratio of said third sun and said third planetary gears.

11. For use in a multi-speed transmission, a housing having oppositely disposed spaced apart first and second end plates, an elongated supporting member secured at one end to said first end plate and extending toward said second end plate, a first shaft projecting through said second end plate and being journaled therein for rotation, a cylindrically shaped carrier inside said housing, said carrier having a part-cylindrical body and two end plates, one carrier end plate being rotatably mounted on said supporting member, the other carrier end plate being secured to the end of said shaft which projects into said housing, an axially extending planetary shaft having opposite ends journaled in said carrier end plates, respectively, said planetary shaft being disposed in the open portion of said body, at least one sun gear rotatably mounted on said supporting member inside said carrier and rotatable about the carrier axis, a first planetary gear on said planetary shaft meshed with said sun gear, a second shaft passing through one of said housing end plates and one of said carrier end plates and rotatable about an axis coextensive with said carrier axis, a second sun gear on the end of said second shaft which projects inside said carrier, a second planetary gear on said planetary shaft meshed with said sun gear, and means for selectively holding said one sun gear against rotation.

References Cited in the file of this patent

UNITED STATES PATENTS

| | | |
|---|---|---|
| 1,418,537 | Cotal | June 6, 1922 |
| 2,286,485 | Hild | June 16, 1942 |
| 2,441,989 | Brown | May 25, 1948 |

FOREIGN PATENTS

| | | |
|---|---|---|
| 899,231 | France | Aug. 7, 1944 |